(12) United States Patent
Wilson et al.

(10) Patent No.: US 11,515,822 B2
(45) Date of Patent: Nov. 29, 2022

(54) ADAPTIVE TORQUE DISTURBANCE CANCELLATION FOR ELECTRIC MOTORS

(71) Applicant: TEXAS INSTRUMENTS INCORPORATED, Dallas, TX (US)

(72) Inventors: David L. Wilson, Muskego, WI (US); Jorge Zambada Tinoco, San Diego, CA (US); David Patrick Magee, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 110 days.

(21) Appl. No.: 16/865,600

(22) Filed: May 4, 2020

(65) Prior Publication Data
US 2020/0336093 A1     Oct. 22, 2020

Related U.S. Application Data

(63) Continuation of application No. 15/217,745, filed on Jul. 22, 2016, now Pat. No. 10,666,180.
(Continued)

(51) Int. Cl.
*H02P 23/04* (2006.01)
*H02P 23/00* (2016.01)
*H02P 6/10* (2006.01)

(52) U.S. Cl.
CPC .......... *H02P 23/04* (2013.01); *H02P 6/10* (2013.01); *H02P 23/0077* (2013.01); *H02P 2205/07* (2013.01)

(58) Field of Classification Search
CPC ......... H02P 6/10; H02P 23/0077; H02P 23/04
(Continued)

(56) References Cited

U.S. PATENT DOCUMENTS 4,831,318 A * 5/1989 Yuasa ............... G05B 19/19
                                                  318/621
5,600,221 A * 2/1997 Tomatsuri ........... G05B 19/237
                                                  318/632
(Continued)

FOREIGN PATENT DOCUMENTS

JP     2006331323 A     12/2006
JP     2008189225 A  *  8/2008  ............. B62D 5/046

OTHER PUBLICATIONS

Zambada, Jorge "Tame Your Noisy Motor—Dynamic Compensation," http://www.embedded.com/design/mcus-processors-and-socs/4441301/Tame-your-noisy-motor—Dynamic-compensation, Feb. 9, 2016, (11 pages).
(Continued)

*Primary Examiner* — Jorge L Carrasquillo
(74) *Attorney, Agent, or Firm* — Carl G. Peterson; Charles A. Brill; Frank D. Cimino (57) ABSTRACT

An adaptive torque disturbance cancellation method and motor control system for rotating a load are described. The system has: (i) a speed controller for receiving a first input signal indicating a desired motor speed and, in response, for outputting a motor control signal; (ii) current sensing circuitry for sensing current through a motor that rotates in response to the speed controller; (iii) circuitry for storing, into a storage device, history data representative of the current through a motor when the motor operates to rotate the load; and (iv) circuitry for modifying the motor control signal in response to the history data.

21 Claims, 6 Drawing Sheets

Related U.S. Application Data (60) Provisional application No. 62/195,495, filed on Jul. 22, 2015.

(58) Field of Classification Search
USPC ............ 318/448, 400.12, 568.22, 596, 632
See application file for complete search history.

(56) References Cited

U.S. PATENT DOCUMENTS

| | | |
|---|---|---|
| 5,998,952 A | 12/1999 | McLaughlin et al. |
| 6,986,688 B1 | 1/2006 | Jansen |
| 7,084,596 B2 * | 8/2006 | Iwashita ............... G05B 19/404 318/632 |
| 2002/0113615 A1 * | 8/2002 | Atarashi ............... H02P 29/662 318/400.01 |
| 2004/0145330 A1 | 7/2004 | Maslov et al. |
| 2006/0125439 A1 * | 6/2006 | Ajima ..................... B60K 6/48 318/716 |
| 2006/0173573 A1 * | 8/2006 | Hosokawa ........... G05B 19/404 700/193 |
| 2010/0109594 A1 * | 5/2010 | Miyaji .................. G05B 19/19 318/632 |
| 2010/0295495 A1 * | 11/2010 | Iwashita ................ G05B 19/19 318/561 |
| 2011/0127938 A1 * | 6/2011 | Kawakami .............. H02P 23/14 318/400.13 |
| 2014/0039694 A1 | 2/2014 | Yamaguchi et al. |
| 2016/0134218 A1 * | 5/2016 | Yamaguchi ........... B60L 15/025 318/139 |
| 2016/0218652 A1 * | 7/2016 | Yamaguchi ............. H02P 23/12 |

OTHER PUBLICATIONS

Innovations in Motion Control, Part I—Learned Effort, Motion Fundamentals, Motion Control, Mar./Apr. 2002 (2 pages).
Innovations in Motion Control, Part II—Vibration Control, Motion Fundamentals, Motion Control, May/Jun. 2002 (2 pages).

* cited by examiner

ADAPTIVE TORQUE DISTURBANCE CANCELLATION FOR ELECTRIC MOTORS

CROSS-REFERENCE TO RELATED APPLICATIONS

This application is a continuation of U.S. patent application Ser. No. 15/217,745, filed Jul. 22, 2016, which claims priority to and the benefit of U.S. Provisional Patent Application 62/195,495, filed Jul. 22, 2015, each of which is hereby incorporated by reference in its entirety.

STATEMENT REGARDING FEDERALLY SPONSORED RESEARCH OR DEVELOPMENT

Not Applicable.

BACKGROUND OF THE INVENTION

The preferred embodiments relate to electric motor systems and methods and, more particularly, to adaptive torque disturbance cancellation in such systems and methods.

Electric motors are implemented in numerous systems and, in many applications, drive a load with a strong periodic torque disturbance. For example, loads that create such a disturbance include a reciprocating compressor, a washing machine, a piston load, and so forth. The changing load torque affects motor speed, which in turn affects current demand in responding to the altered motor speed. Specifically, a load torque increase tends to slow down the motor speed, and, in the prior art, the reduced speed is detected (e.g., by a speed controller) and, in response, current to the motor is increased to counteract the change in load torque. The effectiveness of the speed controller to regulate speed under these conditions, however, may fall short of the value required to achieve the desired speed regulation in most cases, as further detailed below.

Figure 1:
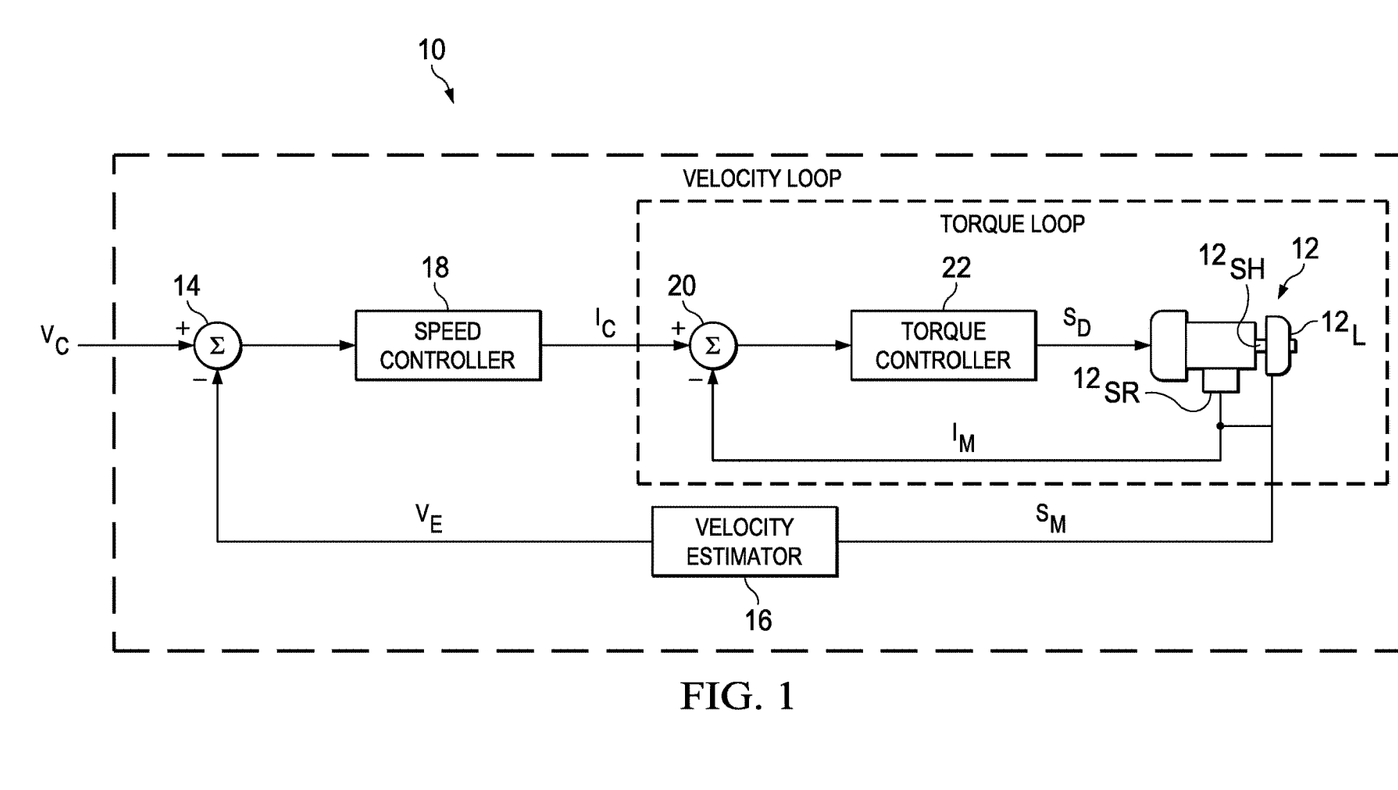
FIG. 1 illustration a simplified, abstracted view of a conventional motor control system 10.

FIG. 1 illustration a simplified, abstracted view of a conventional motor control system 10, by way of further introduction. System 10 includes a motor 12 that rotates a shaft $12_{SH}$ to turn a load $12_L$, where load $12_L$ is shown merely as a plate on shaft $12_{SH}$ with the understanding that a larger device may be connected thereto, to rotate either in 1:1 relationship with shaft $12_{SH}$ or as some multiple, such as through some gearing or other translational system. Motor 12 is connected in a feedback configuration that in general includes a velocity loop and within the velocity loop is a torque loop, both shown in dashed rectangles. A commanded velocity $V_C$ signal represents a desired velocity of motor 12 and is input to an error generator 14, which also receives a feedback input as an estimated velocity $V_E$ from a velocity estimator 16. Velocity estimator 16 receives one or more signals $S_M$ from a sensor(s) $12_{SR}$, at motor 12; these signals may represent a motor shaft mechanical (i.e., angular) position $\theta_m$, or the signals may be current and voltage, from which velocity estimator 16 can estimate the angular velocity $V_E$. The output of error generator 14 is connected to an input of a speed controller 18, which typically applies a function, such as a proportional-integral (PI) control function, to the error signal between commanded velocity $V_C$ and estimated velocity $V_E$, with that error signal provided by error generator 14. The output of speed controller 18 is a commanded current $I_C$, which is connected as an input to an error generator 20, which also receives a feedback input as a measured current $I_M$ from sensors $12_{SR}$ at motor 12. The output of error generator 20 is connected to an input of a torque controller 22, which typically applies a function, also such as a proportional-integral control function, to the error signal between commanded current $I_C$ and measured current $I_M$, with that error signal provided by error generator 20. In response, torque controller 22 outputs a drive signal $S_D$ (or plural signals) which may comprise data signals that ultimately become the drive signal to motor 12.

The general operation of system 10 is readily understood in the art. Commanded velocity $V_C$ is input with a goal toward operating motor 12 at that velocity, and the feedback and PI operations thus endeavor toward satisfying that goal. As further background to the preferred embodiments, however, introduced earlier is the notion that a motor load with a strong periodic torque disturbance affects the speed of motor 12. Thus, in FIG. 1, velocity estimator 16 provides estimated velocity $V_E$ as feedback that will indicate the reduced speed from the torque disturbance, thereby increasing the error indicated by error generator 14 and causing speed controller 18 to increase the commanded current $I_C$. The effectiveness of speed controller 18 to regulate speed, however, is dependent on its gain, where higher gains result in more constant motor speed. But the speed controller gain is usually limited by the stability requirements of the system, so that limitation may cause speed regulations that still vary undesirably or fail to reach desired levels in certain applications. Further, when the load reaches a different point in the mechanical cycle, the torque decreases, which causes speed controller 18 to increase motor speed. But once again, speed controller 18 cannot respond as quickly as desired, resulting in speed overshoot. This process repeats over and over again, resulting in a cyclical speed disturbance. The derivative of speed is acceleration, and the derivative of acceleration is jerk, which is directly proportional to the mechanical shock to the system. As jerk increases, so does the audible noise and mechanical wear of the system.

Given the preceding discussion, while the prior art approaches may be acceptable in certain implementations, some applications may have requirements that are not sufficiently addressed by the prior art. Thus, the present inventors seek to improve upon the prior art, as further detailed below.

BRIEF SUMMARY OF THE INVENTION

In a preferred embodiment, there is a motor control system for rotating a load. The system comprises a speed controller for receiving a first input signal indicating a desired motor speed and, in response, for outputting a motor control signal. The system also comprises current sensing circuitry for sensing current through a motor that rotates in response to the speed controller. The system also comprises circuitry for storing, into a storage device, history data representative of the current through a motor when the motor operates to rotate the load. The system also comprises circuitry for modifying the motor control signal in response to the history data.

Numerous other inventive aspects are also disclosed and claimed.

DETAILED DESCRIPTION OF EMBODIMENTS

FIG. 1 was described in the Background of the Invention section of this document and the reader is assumed familiar with the principles of that discussion.

Figure 2:
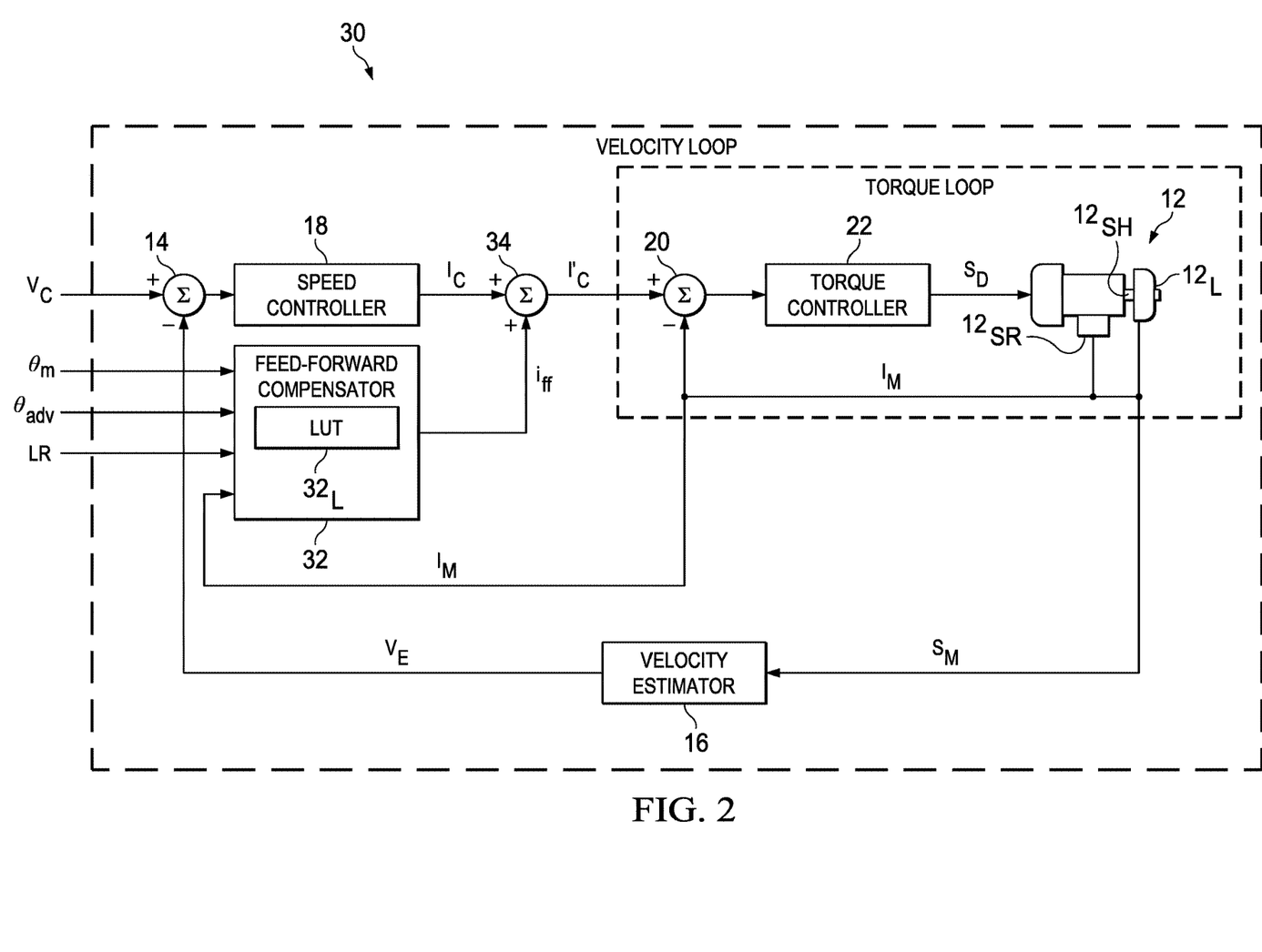
FIG. 2 illustrates a preferred embodiment motor control system with feed-forward compensation that implements an adaptive methodology that learns a periodic noise signature created by a pulsating torque load and applies a correction signal to cancel the noise.

FIG. 2 illustrates a simplified block diagram of a preferred embodiment motor system 30. System 30 is shown in simplified form so as to focus the discussion on various preferred embodiment aspects, with a more detailed illustration of a full field-oriented control ("FOC") system shown later in FIG. 6. In any event, by way of introduction, system 30 improves on the prior art by including a feed-forward compensation that implements an adaptive methodology that learns a periodic noise signature created by a pulsating torque load and applies a correction signal to cancel the noise. Prior to discussing those aspects, however, note that system 30 also includes the same items shown in system 10 of FIG. 1, so for those items the same reference numbers from FIG. 1 are carried forward into FIG. 2. Briefly revisiting those items, therefore, system 30 includes a motor 12 receiving a drive signal $S_D$ (or plural signals) from a torque controller 22. The speed of motor 12 is estimated by a velocity estimator 16, in response to one or more signals $S_M$ from sensor(s) $12_{SR}$, those signals representing a shaft mechanical angular position $\theta_m$, or the signals may be current and voltage, from which velocity estimator 16 can estimate the angular velocity $V_E$. The velocity estimate $V_E$ from the velocity estimator 16 is connected as one input to an error generator 14, the other input of which is connected to a commanded velocity $V_C$, where the difference between those two signals is input to speed controller 18, which applies a function, such as a proportional-integral (PI) control function, to the error signal.

System 30 of FIG. 2 differs from the prior art system 10 in that system 30 includes an additional feed-forward compensator 32, which receives plural inputs and provides a feed-forward current component $i_{ff}$ to an adder 34, which is connected between speed controller 18 and error generator 20. More particularly, in a preferred embodiment, feed-forward compensator 32 receives the following four inputs:

(1) $\theta_m$: angular position of motor 12 (i.e., rotational angle of its shaft $12_{SH}$), either measured directly from motor 12 or estimated by an angle observer;

(2) $\theta_{adv}$: an angle advance signal that accounts for timing delays between a read from a look-up table (LUT) of feed-forward compensator 32 and the application of the torque controller command, $S_D$, to the motor 12;

(3) LR: a learning rate coefficient, which indicates a rate at which feed-forward compensator 32 updates its LUT so as to converge its feed-forward current component $i_{ff}$ to a relatively consistent periodic waveform; and (4) $I_M$: the measured current from sensors (not separately shown in FIG. 2), which is also connected, as described earlier, to error generator 20.

As will be detailed below, in response to the above four inputs, feed-forward compensator 32 adjusts the feed-forward current component $i_{ff}$ and that signal is added to the output signal of speed controller 18 by adder 34, with the sum of those two signals representing the commanded current $I'_C$ input to error generator 20. Thus, feed-forward compensator 32 may modify the commanded current $I_C$ input to adder 34 so as to provide an output current $I'_C$ to error generator 20, which thereafter operates as described earlier and understood to one skilled in the art. The modification to $I_C$, therefore, reduces the effects of periodic torque disturbances from the load $12_L$, as further understood below.

Figure 3:
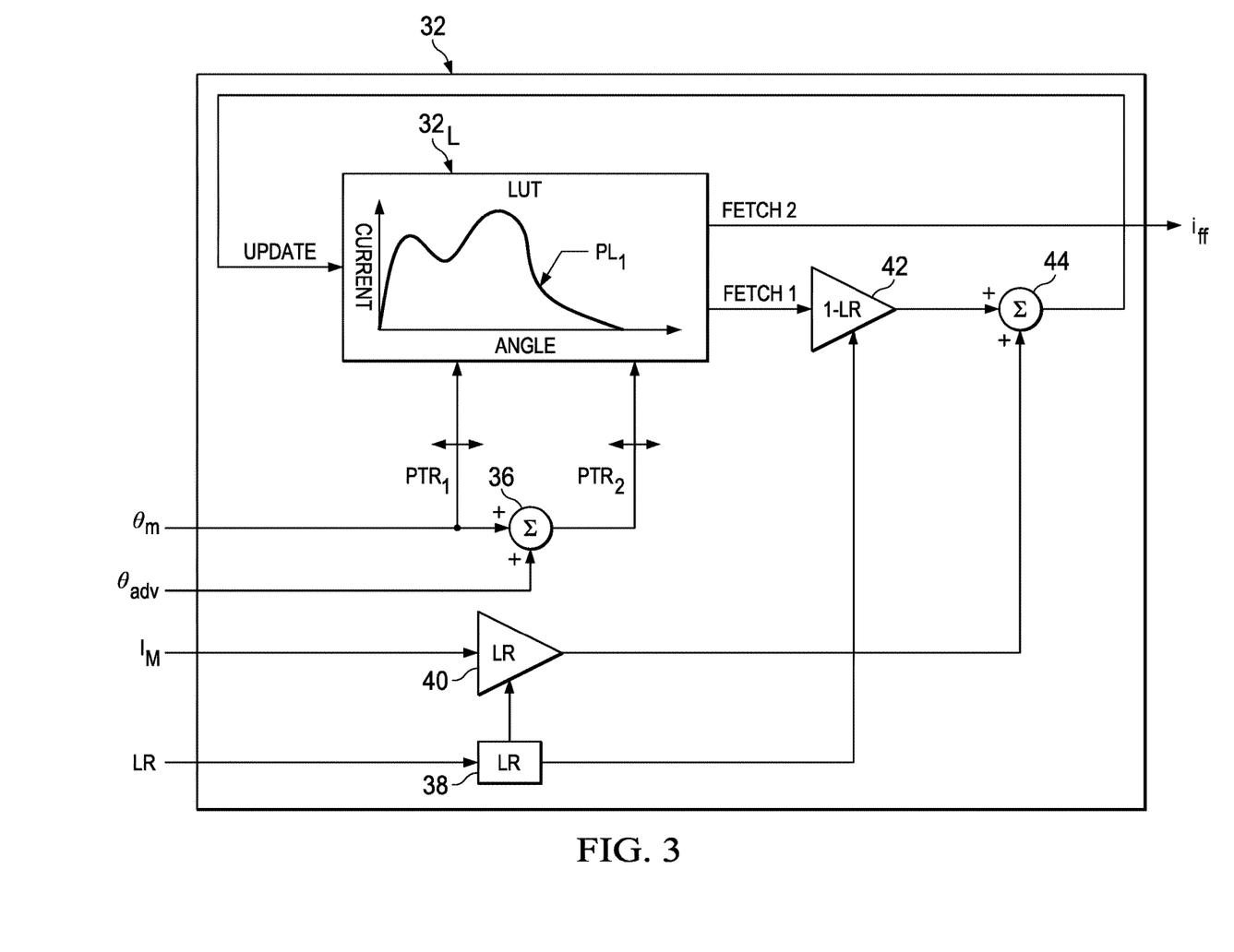
FIG. 3 illustrates an electrical block diagram with additional details of feed-forward compensator 32 from FIG. 2.

FIG. 3 illustrates an electrical block diagram with additional details of feed-forward compensator 32 from FIG. 2. The LUT is a data storage device (e.g., memory) that stores data representing current magnitude at differing angles of shaft $12_{SH}$. The data value labeled FETCH1 is located in the memory address location denoted by first pointer $PTR_1$ and the data value labeled FETCH2 is located in the memory address location denoted by second pointer $PTR_2$. FETCH1 is used to denote the LUT data value being updated, and FETCH2 is used to denote the LUT data value being used as the feed-forward current value $i_{ff}$. As will become evident, below, the LUT data is updated from real-time measurements so as to provide an output signal representing a desired amount of current to apply to motor 12. More specifically, the $\theta_m$ input provides a memory address or index for the first pointer $PTR_1$ to the LUT and is also connected as a first input to an adder 36. The $\theta_{adv}$ input is connected as a second input to adder 36, and the output of adder 36 provides an address or index for the second pointer $PTR_2$ to the LUT. The LR input is connected to a storage element 38, which outputs the value of LR as a control input to a first scaling device 40 for applying LR as a scale factor, and also to a second scaling device 42 for applying 1-LR as a scale factor. The input of first scaling device 40 is connected to receive the measured current $I_M$ and the output of first scaling device 40 is connected to a first input of an adder 44, which has a second input connected to the output of second scaling device 42. The output of adder 44 is fed back as an updated value to the LUT at the memory address denoted by first pointer $PTR_1$, and the data output of the LUT, whose memory address is denoted by second pointer $PTR_2$, provides the feed-forward current component $i_{ff}$.

The operation of feed-forward compensator 32, in the context of system 30 is now described. Initially, the data in the LUT is zeroed and a commanded velocity $V_C$ signal is applied to system 30, which, prior to any feedback will pass to speed controller 18 and adder 34; meanwhile, the value of a feed-forward current component $i_{ff}$ is selected as the FETCH 2 value from the LUT, but because the LUT is initially zeroed, then the feed-forward current component $i_{ff}$ is also zero and therefore provides no offset to the output of speed controller 18. Hence, initially adder 34 provides a commanded current $I'_C$ based solely on the speed controller output signal $I_C$. The current command is also initially unaffected through error generator 20 as there is not yet a feedback measured current $I_M$, so the unchanged value is processed by torque controller 22 to provide the signal(s) $S_D$ to start motor 12 operating. Once such operation occurs, however, measured current $I_M$ starts to rise, and that value is fed back not only to error generator 20, but also as an input to feed-forward compensator 32.

As measured current $I_M$ is fed back to feed-forward compensator 32, it is used to update the LUT at the measured angle value $\theta_m$ of shaft $12_{SH}$. For example, if $I_M$=x amps at $\theta_m$=y degrees, then the LUT is updated with a scaled version of those x amps, at a table entry indicated by pointer $PTR_1$ for the address corresponding to y degrees. More particularly, as measured current $I_M$ is fed back into feed-forward compensator 32, it is scaled according to the learning rate LR, which preferably is a value between zero and one. Moreover, the larger the value of LR, the more quickly feed-forward compensator 32 begins to influence the signal applied to motor 12. Such influence occurs first by way of first scaling device 40, which scales $I_M$ by LR, after which the scaled value is added, by adder 44, to one minus that LR scale factor times a FETCH 1 output from the LUT, where the FETCH 1 output is taken from the memory location in the LUT denoted by pointer $PTR_1$, corresponding to the measured angle $\theta_m$. The sum determined by adder 44 is then stored in the LUT, that is, it provides an update to the LUT, as a data point for x scaled amps at the same table location corresponding to $\theta_m$=y degrees. Pointer $PTR_1$ is included in FIG. 3 to depict that it may move along the horizontal angle axis so as to point to the FETCH 1 and update LUT location in this manner, that is, by point to the location of $\theta_m$=y degrees, so as to read and store at that the same memory address location containing the original x scaled amps value. In this regard, therefore, one skilled in the art should appreciate that over time, as shaft $12_{SH}$ rotates through full rotations and incurs a periodic load waveform, then measured current $I_M$ will rise and fall with that waveform. Thus, as the LUT is updated as described above, eventually the plot $PL_1$ of the LUT values, which depicts stored history data representative of the current waveform magnitude as the load torque is incurred, will converge to the periodic current values needed to compensate for the periodic torque disturbance.

Preferred embodiments benefit from the LUT data converging in a stable fashion. In this regard, the update equation for the LUT current values, $i_{LUT}$, can be written as the following Equation 1:

$$i_{LUT}[m,n+1] = LR \cdot i[m,n] + (1-LR) \cdot i_{LUT}[m,n] \quad \text{Equation 1}$$

where,
m is a mechanical angle index
n is the sample number
LR is a convergence constant, with $0 \leq LR \leq 1$, and LR=0 means that the LUT current value is not updated while LR=1 means that the LUT current value is equal to the measured current value (as to the latter, if one substitutes LR=1 into Equation 1, the result is $i_{LUT}[m,n+1]=i[m,n]$, thereby indicating there is no averaging, as the new LUT value is the same as the measured value). The update Equation 1 is guaranteed to be stable over the LR range indicated above. Smaller LR values ensure more averaging at each mechanical angle.

Further, as mentioned above, at initialization/startup time, the LUT values are all initialized to zero. The angle resolution of the LUT table, $\Delta\theta$, can be determined from the following Equation 2:

$$\Delta\theta = \frac{360°}{N} \quad \text{Equation 2}$$

where, N is the number of points in the LUT for one mechanical revolution.

To determine a particular mechanical angle index, the following Equation 3 can be used:

$$m = \text{mod}\left(\frac{\theta_m}{\Delta\theta}, N\right) \quad \text{Equation 3}$$

where mod( ) is the modulo operator.

Given the preceding discussion, as the LUT is updated as described above and its waveform converges on a same shape as the current level that is proportional to the torque disturbance waveform, then at the same time it provides a FETCH 2 output as the compensated feed-forward current component $i_{ff}$. Thus, the feed-forward current component $i_{ff}$ will converge to an angle dependent waveform whose values can be used to anticipate the change in load torque as shaft $12_{SH}$ rotates and compensating on the fly with a historic record of how that change will occur, with that record being the waveform in the LUT. In this regard, it is recognized in connection with a preferred embodiment that as shaft $12_{SH}$ is at a measured angle $\theta_m$, then a value of current $i_{LUT}$ could be selected at that angle and used as the current to be instantaneously applied to motor 12. However, it is further recognized that there are delays due to table reading, computation time, electronic delay, etc. Thus, to determine which LUT current value to use for the feed-forward component, the latency of the system should be considered when determining the correct LUT current value to use. This time latency, $\Delta T_{lat}$, contributes to an angle advance needed to read the correctly addressed value from the LUT as the motor rotates at a given mechanical speed, $\omega_m$, which has units of rad/sec. The angle advance can be calculated using the following Equation 4:

$$\theta_{adv}[n] = \omega_m \cdot \Delta T_{lat} \cdot \left(\frac{180°}{\pi}\right) \quad \text{Equation 4}$$

The angle used to read the LUT current value for feed-forward compensation can be determined using the following Equation 5:

$$\theta_{ff}[n] = \theta_m[n] + \theta_{adv}[n] \quad \text{Equation 5}$$

where,
$\theta_{ff}[n]$ is angle used to read the LUT current value for feedforward compensation and corresponds to the memory address denoted by pointer $PTR_2$;
$\theta_m[n]$ is the mechanical angle of motor 12; and
$\theta_{adv}[n]$ is the mechanical angle advance to account for the system latency.

As a result, the $\theta_{adv}$ input provides an angular advancing offset, so as to advance the read location in the LUT into the future by a small amount relative to the present location of the motor shaft, so that the resulting current read from the LUT will be very close to the desired value needed to compensate the torque disturbance as the mechanical angle reaches that point in time when the control command is actually applied to the motor; this advancement is shown in FIG. 3 as the pointer $PTR_2$, which also is able to read from any angle in the LUT, and by way of adder 36, the read occurs at the added offset of $\theta_{adv}$, relative to the present input value of $\theta_m$. For example, assume at a given time that $\theta_m$=y degrees, and assume that offset of $\theta_{adv}$=4 degrees. Thus, when the value of current for feed-forward current component $i_{ff}$ is read from the LUT for a current input of $\theta_m$=y degrees, that current will be read at the data location for y+$\theta_{adv}$=y+4 degrees. Thus, the read value will represent the angular location of shaft $12_{SH}$ at a time that is 4 degrees in the future, so that when the feed-forward current component $i_{ff}$ for that future position is read from the LUT and its effect eventually propagates into the influence of signal $S_D$ in FIG. 2, by then shaft $12_{SH}$ will have advanced by $\theta_{adv}$=4 degrees and will therefore be at the angular location corresponding to the position read from the LUT at the location of pointer $PTR_2$. Note also that $\theta_{adv}$ is a function of motor speed, and best cancellation can be obtained if this value is updated as a function of commanded velocity. For most practical applications, in one preferred embodiment, this input only needs to be set once at initialization. An alternative preferred embodiment, however, contemplates updating $\theta_{adv}$, such as at fixed intervals or in response to some type of change in conditions. In any event, $\theta_{adv}$ thusly directs the ultimate selection of the feed-forward current, which mathematically can be shown by transforming Equation 5 into mechanical angle index as in the following Equation 6:

$$\mathrm{mod}\left(\frac{\theta_{ff}[n]}{\Delta\theta}, N\right) = \mathrm{mod}\left(\frac{\theta_m[n] + \theta_{adv}[n]}{\Delta\theta}, N\right) \quad \text{Equation 6}$$

to yield the following Equation 7:

$$m_{ff}[n] = \mathrm{mod}\left(\frac{\theta_m[n] + \theta_{adv}[n]}{\Delta\theta}, N\right) \quad \text{Equation 7}$$

Thus, the feedforward current component at sample number n can be written as the following Equation 8:

$$i_{ff}[n] = i_{LUT}[m_{ff}[n], n] \quad \text{Equation 8}$$

From the above, note that as feed-forward compensator 32 operates, its LUT will become populated with values that resemble the measured current waveform at a rate determined by the learning rate LR input, with that input therefore defining the aggressiveness of how fast compensator 32 stores data (i.e., "learns") representing distortion in current due to the periodic torque disturbance. If the torque disturbance waveform is fairly repeatable from cycle to cycle, then the learning rate can be set to a higher value, which results in noise cancellation almost immediately. However, if the torque disturbance waveform has a basic shape but is not exactly the same from cycle to cycle, then the learning rate should be set to a lower value, which results in the LUT waveform representing the average shape of the torque disturbance over several cycles. In a preferred embodiment, therefore, in most applications, the learning rate LR input should only need to be set once at initialization.

In another aspect of a preferred embodiment, the LUT methodology update can be periodically enabled and disabled, for example so as to save power (e.g., eliminating processing MIPS) at times when the LUT data is sufficient so as to cancel torque disturbance beyond a particular threshold. In this regard, in a preferred embodiment, an error measure, e[n] can be defined as shown in the following Equation 9:

$$e[n] = i_{LUT}[m, n+1] - i_{LUT}[m, n] \quad \text{Equation 9}$$

Given Equation 9, in this preferred embodiment, if an absolute value of e[n] satisfied (e.g., falls below) a threshold (e.g., 0.001 A=1 mA), the LUT update process is disabled, such as for a period of time. During this disabled time period, therefore, processing power is saved. The process may be re-enabled later, in response to one more conditions (e.g., passage of time; new torque load; a stop and re-start of motor 12, etc.).

Figure 4:
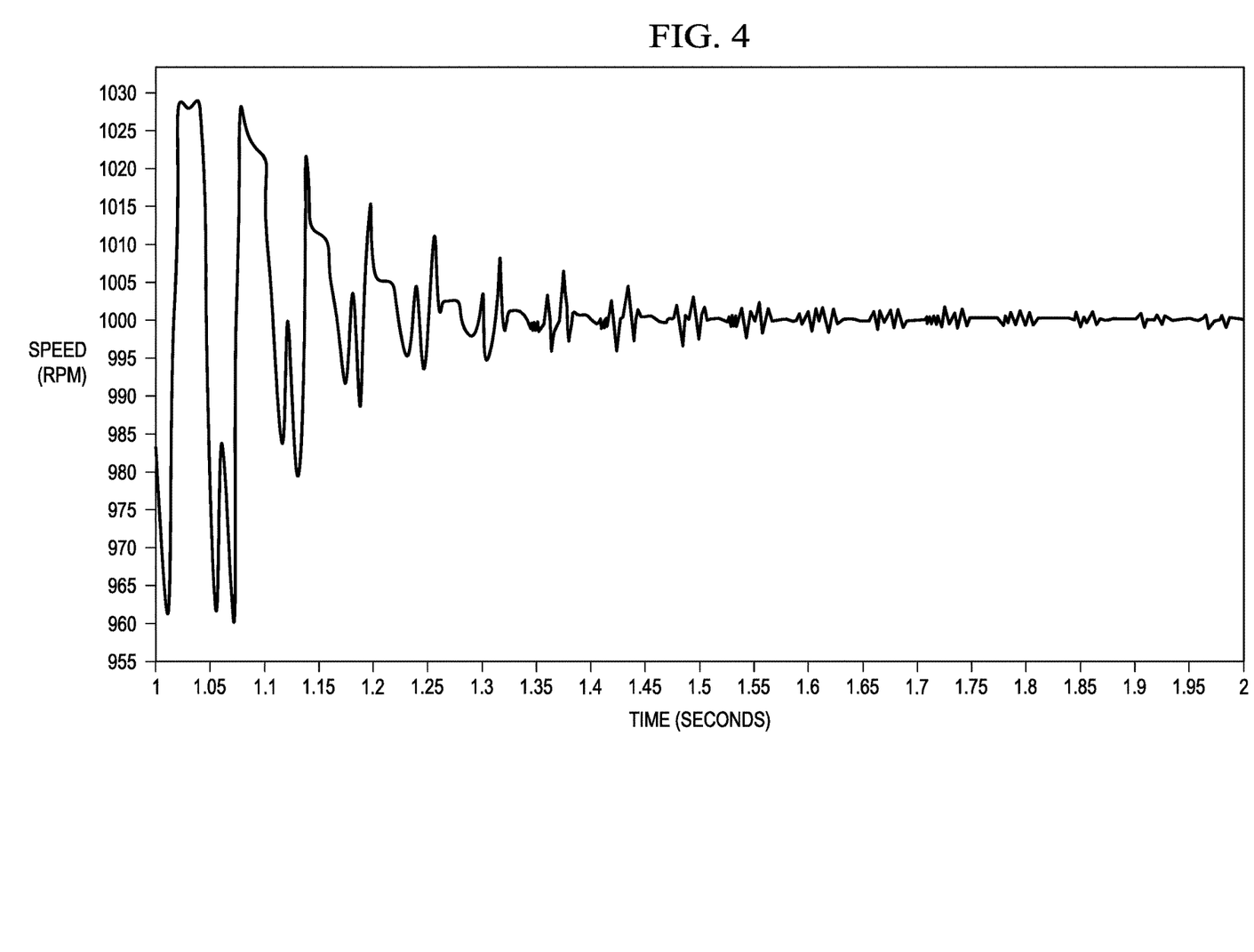
FIG. 4 illustrates a timing diagram of the operation of system 30, with time in units of seconds along the horizontal axis and rotational speed of motor 12 in units of revolutions per minute (RPM) in the vertical axis.

FIG. 4 illustrates a timing diagram of the operation of system 30, with time in units of seconds along the horizontal axis and rotational speed of motor 12 in units of revolutions per minute (RPM) in the vertical axis. At time t=1 second, feed-forward compensator 32 is turned on and, thus, per the above discussion, the LUT begins to populate given the sensed current $I_M$, that is, in relation to the load torque disturbance. In the example illustrated, the learning rate LR is equal to 0.5 and $\theta_{adv}$=4 degrees. Initially, from time t=1 to approximately t=1.1, the diagram indicates that motor 12 speed varies between a high level between approximately 1025 to 1030 RPM to a low level of approximately 965 to 970 RPM. However, by time t=1.25 seconds, the variation is reduced such that motor 12 speed varies between a high level of approximately 1012 down at low level of approximately 997. Still further, note that by t=2 seconds, the variation is down within ±2 RPM. Thus, a preferred embodiment provides an improved variance in motor speed over time even under the disturbance of the torque load, as feed-forward compensator 32 refines its LUT and its feed-forward current value $i_{ff}$ correctly matches or approximates the torque load demand.

Figure 5:
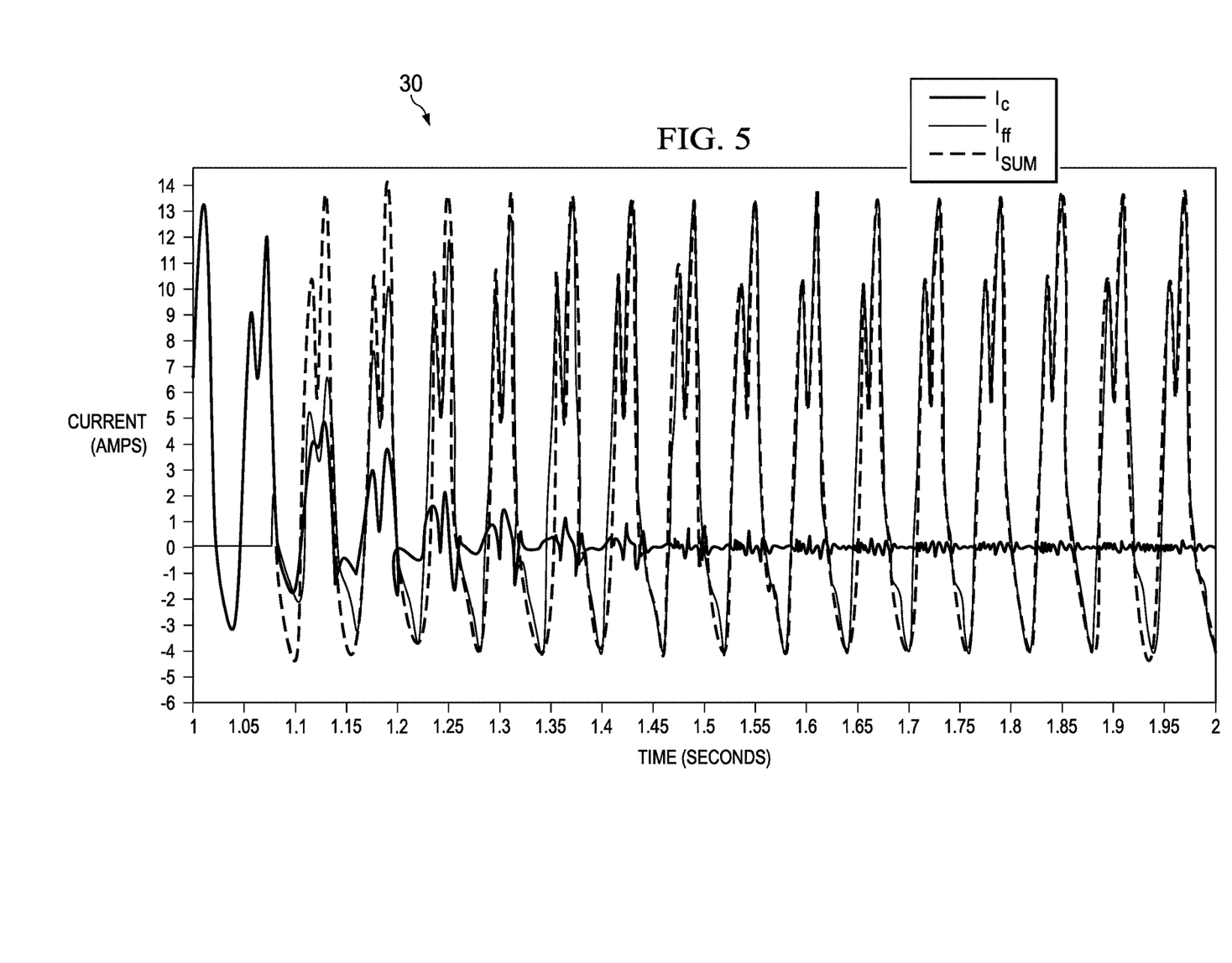
FIG. 5 illustrates a timing diagram of the operation of system 30, with time in units of seconds along the horizontal axis, and along the vertical axis are current values affecting the speed of motor 12.

FIG. 5 illustrates a timing diagram of the operation of system 30, with time in units of seconds along the horizontal axis, and along the vertical axis are three current values: (i) $I_C$ from speed controller 18; $i_{ff}$ from feed-forward compensator 32; and (iii) a summed current $I_{SUM}$ which is the total of $I_C$ and $i_{ff}$. At time t=1 second, feed-forward compensator 32 is turned on and, thus, per the above discussion, the LUT begins to populate given the sensed current $I_M$; in the meantime, $I_C$ from speed controller 18 is shown as the dominant (if not sole) current until approximately time t=1.1 seconds, at which time $i_{ff}$ from feed-forward compensator 32 begins to contribute to the overall summed current $I_{SUM}$ that is driving motor 12. Thereafter, feed-forward compensator 32 continues to gradually provide more and more of the overall total of $I_{SUM}$. Moreover, by t=2 seconds, current $i_{ff}$ from feed-forward compensator 32 provides virtually all of the motor driving current, that is, compensator 32 in approximately one second has learned the current level corresponding to the torque disturbance and is thereby able to achieve a steady-state operating condition where, for a given commanded velocity $V_C$, compensator is supplying all of the commanded current waveform. When this condition is met, then the output signal from speed controller 18 itself must approximate or be zero, which means that the speed error signal must also be zero and the measured speed must very closely approximate or be exactly equal to the commanded speed. Furthermore, since the periodic variation of measured speed is zero (or close to zero), the load acceleration caused by load torque distortions will also be zero (or close to zero), and the mechanical jerk (the derivative of acceleration), which is responsible for mechanical shock, wear, and audible noise, is also significantly reduced. Still further, it is anticipated from testing that an unexpected, but beneficial characteristic of the operation of the compensator 32 is that since the x-axis of the LUT represents angle and not time, when the commanded speed $V_C$ changes, the output waveform (including any adaptive learning which is in progress) stays synchronized with the load distortion. The implication, therefore, is system 30 does not have to zero out the LUT and relearn the distortion every time a change in $V_C$ occurs.

Figure 6:
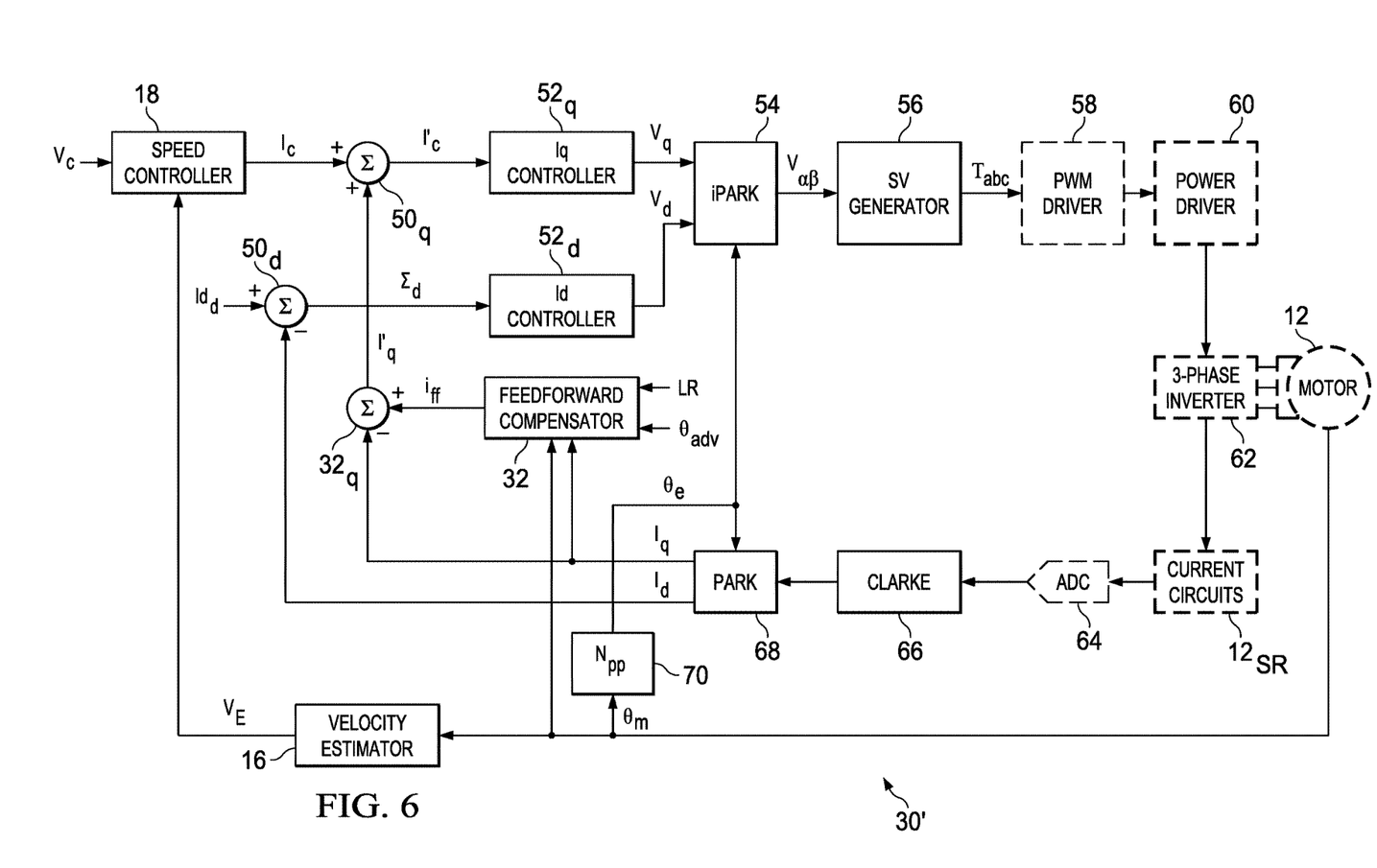
FIG. 6 illustrates a more detailed illustration of feed-forward compensator 32 as implemented in a FOC controller system 30' for controlling the operation of an AC motor 12.

FIG. 6 illustrates a more detailed illustration of feedforward compensator 32 as implemented in a FOC (Field-Oriented-Control) controller system 30' for controlling the operation of an AC (Alternating Current) motor 12. In this architecture, speed controller function 18 is a control function that receives a desired motor speed input signal $V_C$ along with a feedback rotor velocity estimate $V_E$ from a velocity estimator 16. Speed controller 18 typically applies a function, such as a proportional-integral control function, to a difference (i.e., error signal) between motor speed input signal $V_C$ and velocity estimate signal $V_E$ to generate the desired quadrature phase reference current signal $Iq_d$ for application to summation block $50_q$. Summation block $50_q$ sums $I_q'$ from a summer $32_q$, which is the difference (i.e., error signal) between the quadrature phase feedback current Iq and the feed-forward current value $i_{ff}$, and the output from the speed controller, $I_c$. The output of summation block $50_q$ produces the feedforward compensated current signal $I'_c$ that is applied to a proportional-integral (PI) Iq controller $52_q$. Similarly, error generator $50_d$ receives a desired direct phase reference current $Id_d$ and direct phase feedback current $I_d$, and produces error signal εd (i.e., $Id_d$ minus $I_d$) that is applied to proportional-integral (PI) Id controller $52_d$. Controllers $52_q$ and $52_d$ each apply a conventional control function, for example a combination of proportional and integral functions, to the current signal $I'_q$ and error signal εd, respectively, to produce corresponding respective direct phase control signal $V_q$ and quadrature phase control signal $V_d$, both of which are applied to an inverse Park transform function 54. Inverse Park transform function 54 transforms the d and q phase control signals $V_d$, $V_q$ to spatially fixed α and β phase control signals $V_α$ and $V_β$ (shown in FIG. 6 as $V_{αβ}$) and applies those signals to a space vector generator 56, which in turn produces three-phase data signals $T_a$, $T_b$, $T_c$ (shown in FIG. 6 as $T_{abc}$) that represent duty cycles (i.e., pulse widths) for corresponding motor phases; these data signals are applied to PWM drivers 58 that generate the pulses applied to the stator windings of motor 12 via power driver 60 and inverter 62. PWM drivers 58 commonly include timers that control the start and stop times of each drive pulse, in response to data signals $T_a$, $T_b$, $T_c$.

The feedback side of the control loop in system 30' receives feedback signals from multiple sources, all such sources based on sensors at motor 12 and corresponding sense circuits $12_{SR}$. One source of feedback signals is a set of current sample streams produced by ADC 64 based on output from sense circuits $12_{SR}$, and which represent currents induced in the stator windings by the rotor of motor 12 as it rotates. Current sample streams from ADC 64 are applied to a Clarke transform function 66 to produce spatially fixed α and β phase feedback signals transforming the three-phase time invariant system of differential equations into a two coordinate time variant system. These transformed feedback signals are input to a Park transform function 68, which in turn produces direct and quadrature phase feedback currents Id, Iq, respectively. An $N_{pp}$ (number of pole pairs of the motor) block 70 transforms the mechanical angle, $θ_m$, to an electrical angle $θ_e$, which is connected to Park transform function 68 and to an inverse Park transform function 54.

Given the preceding, both the generalized FIG. 2 and the more detailed FIG. 6 preferred embodiments provide motor systems and methods that adaptively cancel noise with an LUT that learns a current waveform profile in response to torque disturbance. Thus, a preferred embodiment learns a periodic noise signature created by pulsating torque loads and applies a correction signal to cancel the noise. Preferred embodiments, therefore, provide numerous advantages and benefits. For example, a preferred embodiment has been successfully implemented including a compressor product using FOC with a permanent magnet synchronous motor. The result was a dramatic reduction in audible noise from the system. As another benefit, more broadly the inventive scope allows it to be applied to any motor with a periodic pulsating load torque, where noise reduction is desired. As a result, market demand is expected, particularly from customers desiring to have motor-based products run quieter. Moreover, preferred embodiments achieve these benefits with smooth motor operation by reducing or eliminating the periodic variations in speed, without the prior art concern of increasing the gain of the speed controller. Still further, quieter motor operation is achieved without any additional hardware required. And, since no additional hardware is required, preferred embodiments may be achieved by retrofitting the inventive scope into existing motor control systems. Still further, quieter operation results in less wear and tear on the mechanics of a system, which increases efficiency and extends the life of the product. Additionally, the preferred embodiment teachings can work with many if not all motor systems (not just field-oriented systems), as long as the load distortion periodicity with respect to motor shaft angle is known ahead of time. Since the learning and compensation processes are done spatially instead of temporally, they will not be interrupted during changes in the desired speed. Still further, implementation with a sampled system on an embedded controller is extremely straightforward with no complex calculations required. Moreover, no load characterization or tuning is required since the technique is adaptive. As yet another benefit, power consumption is reduced because the torque controller does not have to track the periodic variations in current due to the torque disturbance. Lastly, no motor movement at startup is required to synchronize the shaft angle to the LUT angle, since the preferred embodiment methodology is adaptive. From the above, therefore, one skilled in the art should further appreciate that while some embodiments have been described in detail, various substitutions, modifications or alterations can be made to the descriptions set forth above without departing from the inventive scope, as is defined by the following claims.

The invention claimed is:

1. A motor control system comprising:
    a data storage device configured to store a table; and
    a compensator circuit configured to:
        receive a feedback signal corresponding to motion of a motor and a position signal corresponding to a position of the motor;
        provide a control signal based on the position signal and the table, wherein the motor control system is configured to control the motor based on the control signal;
        fetch a current version of a value in the table that corresponds to the position signal;
        determine an updated version of the value in the table that corresponds to the position signal based on the feedback signal and the current version of the value; and
        store the updated version of the value in the table.

2. The motor control system of claim 1, wherein the compensator circuit is further configured to:

receive a learning rate signal;
provide a first scaled signal based on the feedback signal and the learning rate signal;
provide a second scaled signal based on the current version of the value in the table and the learning rate signal; and
determine the updated version of the value in the table based on the first scaled signal and the second scaled signal.

3. The motor control system of claim 2, wherein the compensator circuit is configured to determine the updated version of the value in the table based on a weighted sum of the first scaled signal and the second scaled signal.

4. The motor control system of claim 1, wherein the compensator circuit is configured to:
receive a position advance signal; and
provide the control signal based on a second value in the table that corresponds to the position signal and the position advance signal.

5. The motor control system of claim 1,
wherein the control signal is a first control signal, and
wherein the motor control system further comprises:
a first adder coupled to the compensator circuit and configured to:
receive the first control signal and a second control signal; and
provide a third control signal based on the first and second control signals; and
a second adder coupled to the first adder and configured to:
receive the third control signal and the feedback signal; and
provide a fourth control signal based a difference between the third control signal and the feedback signal.

6. The motor control system of claim 5 further comprising a torque controller coupled to the second adder and configured to:
receive the fourth control signal; and
provide a drive signal for the motor in response to the fourth control signal and based on a proportional-integral control function.

7. The motor control system of claim 1, wherein:
the feedback signal corresponds to current through the motor; and
the position signal corresponds to an angular position of the motor.

8. The motor control system of claim 1, wherein:
the feedback signal is a first feedback signal;
the control signal is a first control signal; and
the motor control system further includes a controller and an adder coupled to the controller and configured to:
receive a velocity command signal and a second feedback signal, wherein the second feedback signal corresponds to a velocity of the motor; and
provide, to the controller, an error signal based on a difference between the velocity command signal and the second feedback signal,
wherein the controller is configured to provide a second the first control signal based on the error signal,
wherein the motor control system is configured to control the motor based on the first and second control signals.

9. The motor control system of claim 1, wherein the compensator circuit is configured to disable determination of the updated version of the value in the table in response to a measure of a change in the table being below a threshold.

10. A method comprising:
receiving a feedback signal corresponding to motion of a motor and a position signal corresponding to a position of the motor;
providing a control signal based on a first value in a table that corresponds to the position signal;
controlling the motor based on the control signal;
fetching a current version of a second value in the table that corresponds to the position signal;
determining an updated version of the second value in the table based on the feedback signal and the current version of the table; and
storing the updated version of the second value in the table.

11. The method of claim 10 further comprising:
receiving a learning rate signal;
providing a first scaled signal based on the feedback signal and the learning rate signal;
providing a second scaled signal based on the current version of the second value in the table and the learning rate signal; and
determining the updated version of the second value in the table based on the first scaled signal and the second scaled signal.

12. The method of claim 11, wherein determining the updated version of the second value in the table by performing weighted addition of the first scaled signal and the second scaled signal.

13. The method of claim 10, wherein the first value in the table that the control signal is based on corresponds to a sum of the position signal and a position advance signal.

14. The method of claim 10, wherein the control signal is a first control signal, the method further comprising:
providing a third control signal based on the first control signal and a second control signal;
providing a fourth control signal based on the third control signal and the feedback signal to a torque converter; and
providing, using the torque converter, a drive signal for the motor in response to the fourth control signal.

15. The method of claim 10,
wherein the feedback signal corresponds to current through the motor, and
wherein the position signal corresponds to an angular position of the motor.

16. The method of claim 10, further comprising disabling determination of the update version of the second value in the table in response to a measure of a change in the table being below a threshold.

17. A motor control system comprising:
a data storage device configured to store a table associating position values with commanded current values; and
a controller configured to:
fetch a current version of a first commanded current value from the table that corresponds to a measured position of a motor;
determine an updated version of the first commanded current value in the table based on a measured current through the motor and further based on the current version of the first commanded current value; and
store the updated version of the first commanded current value in the table.

18. The motor control system of claim 17, wherein the controller is configured to:

determine an advanced position value based on the measured position of the motor;

fetch, from the table, a second commanded current value associated with the advanced position value; and control the motor based on the second commanded current value.

19. The motor control system of claim 18, wherein to determine the advanced position value, the controller is configured to:

determine an offset value based on an estimated velocity of the motor; and determine the advanced position value by summing the offset value and the measured position of the motor.

20. The motor control system of claim 17, wherein to determine the updated version of the first commanded current value, the controller is configured to perform scaled addition on the measured current through the motor and the current version of the first commanded current value.

21. The motor control system of claim 17, wherein the controller is configured to disable determination of the updated version of the first commanded current value in the table in response to a measure of a change in the table being below a threshold.

* * * * *